Nov. 10, 1964     R. M. GEDEON     3,156,135
CONTROL SERVOMECHANISM
Filed Nov. 14, 1962     3 Sheets-Sheet 1
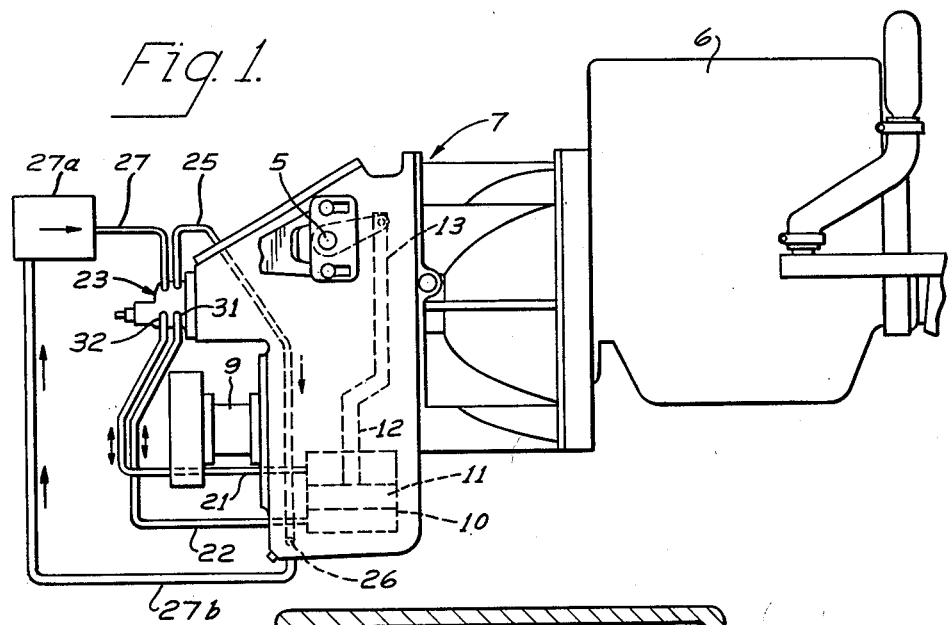
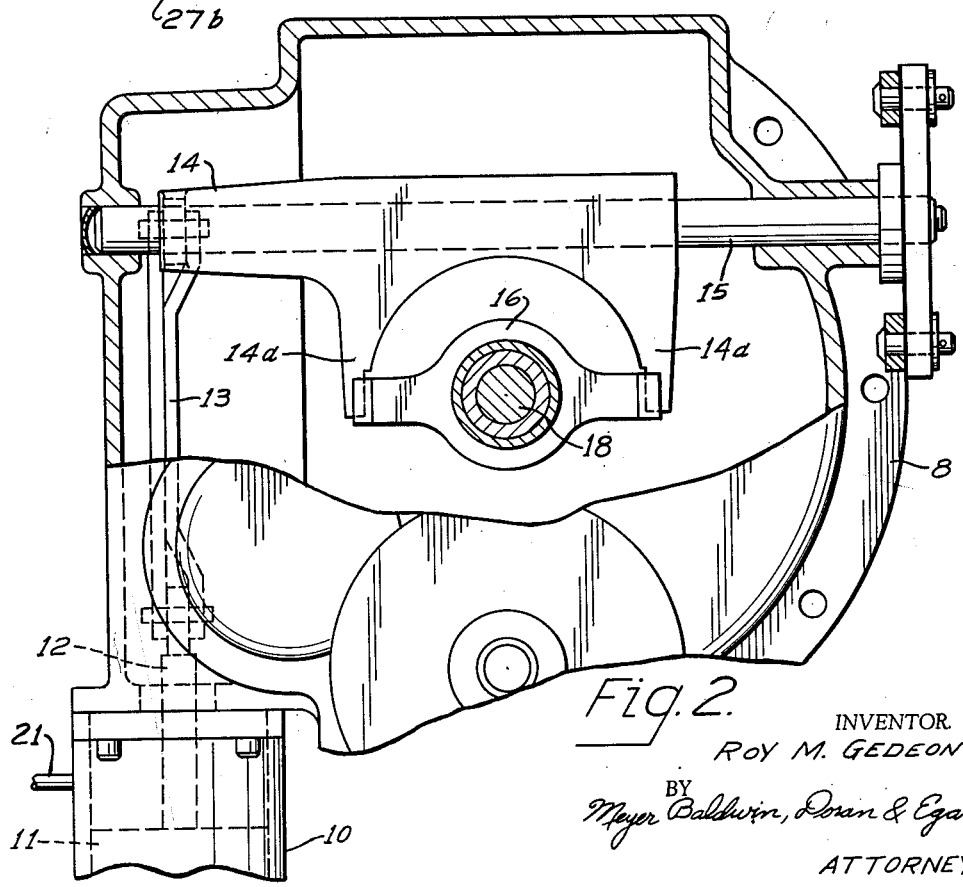
INVENTOR.
ROY M. GEDEON
BY
Meyer Baldwin, Doran & Egan
ATTORNEYS.

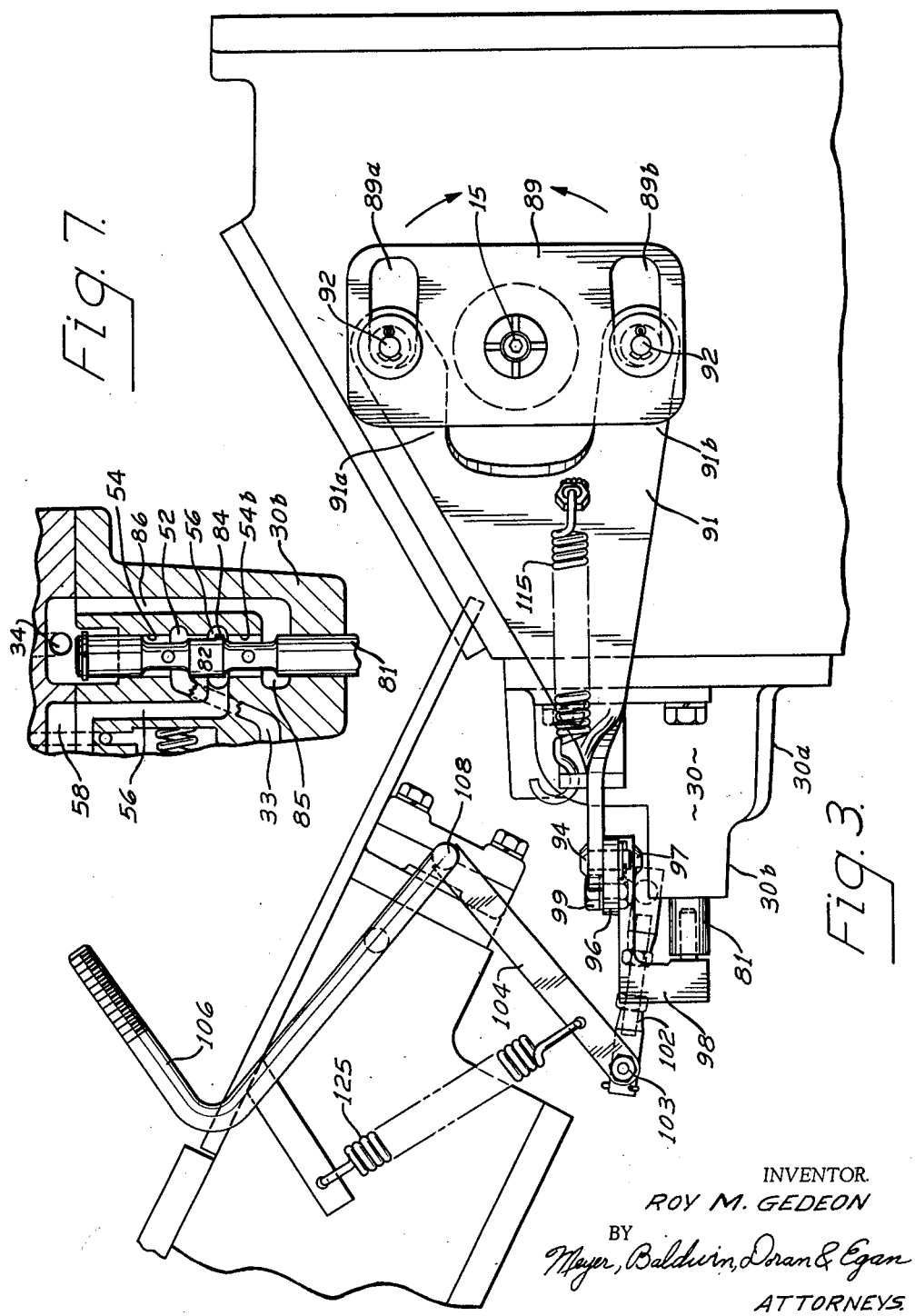

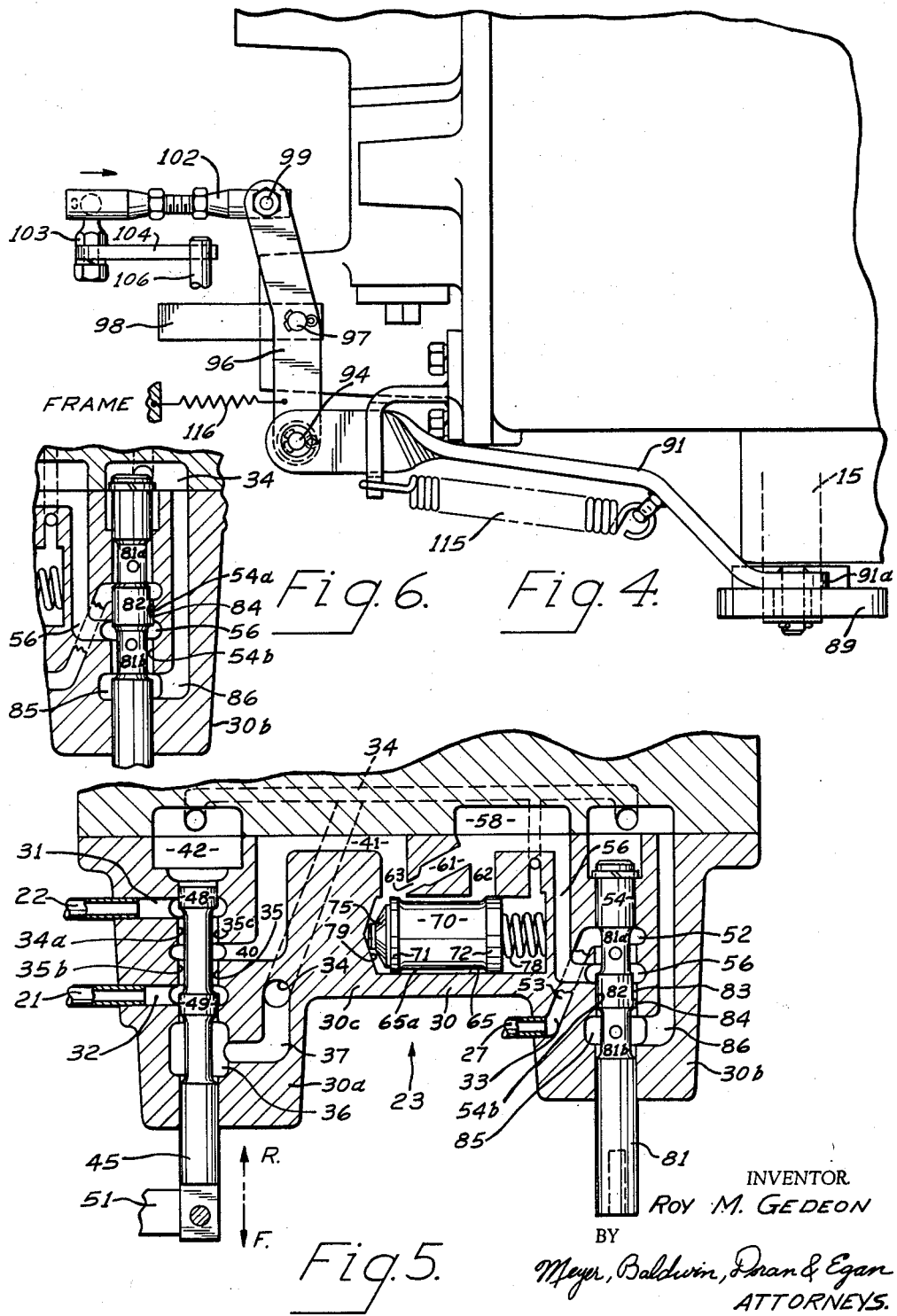

United States Patent Office 3,156,135
Patented Nov. 10, 1964

3,156,135
CONTROL SERVOMECHANISM
Roy M. Gedeon, Cleveland, Ohio, assignor to Towmotor Corporation, Cleveland, Ohio, a corporation of Ohio
Filed Nov. 14, 1962, Ser. No. 237,544
15 Claims. (Cl. 74—732)

This invention relates generally to a control servomechanism especially designed for use in industrial lift trucks and the like, and more particularly to a control servomechanism applicable for use with a fluid operated drive assembly such as the type that is disclosed in United States Patent 2,861,480, issued to Everett C. Curtis on November 25, 1958, and which servomechanism is operable to control the energization of the transmission means of the drive assembly so as to enable the lift truck to be moved slowly at a "creeping or inching" pace.

The servomechanism is also intended, as will be hereinafter disclosed, to enable the lift truck to be moved at the aforesaid "creeping or inching" pace while at the same time operating the engine at a relatively high speed to provide power for manipulating the load supporting apparatus.

In using a lift truck to transport loads within an industrial installation, for example in an installation manufacturing toxic liquids or the like, it is oftentimes necessary to transport said liquids in open containers thus requiring that the same be moved slowly to avoid spillage and possible injury to employees in the surrounding area.

Also, it may be desirable when carrying loads through cramped quarters to have the vehicle move slowly so as to prevent damaging said installation and/or transported load and to enable said load to be accurately placed.

Heretofore, to accomplish this lift truck operation embodying drive means such as is disclosed in the aforementioned Curtis Patent 2,861,480, said drive means has been connected into a hydraulic control system, which functions to control the energization of the transmission unit of said assembly to enable the lift truck to "creep" or move slowly while the engine may be running at a relatively high speed and to thereby enable a load to be manipulated by the load supporting structure of said truck at a relatively higher rate.

A primary disadvantage of hydraulic control systems previously used as is known in the art, is that in order to provide for continuously creeping the vehicle, it is necessary, inasmuch as said control system is what is defined as a closed system, to periodically relieve the hydraulic pressure of the transmission actuating means in an attempt to provide a somewhat constant coupling between the rotatable and stationary elements of said transmission means to thereby result in the application of a constant torque to the drive wheels of said vehicle.

In one type of control system, the vehicle is provided with manual controls normally located at the vehicle operator's position and which the operator may manipulate to periodically relieve the fluid pressure of said hydraulic control system by diverting the fluid therein to the sump of said system. In this type of manual control a periodic relieving of the hydraulic pressure of the aforesaid control system has been found to be undesirable inasmuch as it is almost impossible to sustain a constant system pressure and hence drive coupling between the transmission and engine of the drive assembly whereby as a result the vehicle moves at an uneven rate to result in jolting the load carried thereby.

It is also recognized that in this type of manual control it takes a comparatively skilled operator to determine the proper instant or frequency for relieving the hydraulic pressure from said system in order to provide for "creeping" the vehicle.

In still another type of "creeping" control heretofore used in an industrial lift truck is a control system that is coupled to the hydraulic service brakes of the vehicle and which is foot controlled by the vehicle operator.

In this control system, the truck is attempted to be operated at a slow constant speed by gradually applying the service brakes whereby as the pressure is increased in the brake master cylinder it, in turn, provides for modulating the hydraulic fluid in the clutch actuating means to thereby control the speed of the truck.

The control servomechanism of the present invention is intended to overcome the disadvantages of the aforementioned "creeping" control systems by providing a system control that is somewhat similar to the operation of a manually actuatable clutch in a standard transmission such as is used in a conventional automotive transmission and which is effective to regulate the flow of transmission fluid in the system at a substantially constant preselected rate whereby "inching or creeping" of the vehicle at a constant speed may be easily accomplished.

It is therefore a primary object of the present invention to provide a control servomechanism especially designed for use in a hydraulically controlled lift truck drive assembly and which is intended to be controlled by the vehicle operator to provide for "inching or creeping" the vehicle either in a forward or reverse direction at a substantially constant preselected speed.

Another object of the present invention is to provide a control servomechanism especially designed for use in a hydraulically controlled lift truck drive assembly and which is manually controlled by the vehicle operator to continuously relieve the hydraulic pressure of the control system so as to provide a substantially constant coupling between the rotatable and stationary elements of the transmission means of the drive assembly, resulting thereby in the application of a constant "creeping" torque to the drive wheels of the vehicle.

Still another object of the control servomechanism of the present invention is to provide a hydraulically controlled drive assembly especially designed for use in a lift truck or the like and which control servomechanism is operable in a manner somewhat similar to the operation of a clutch control in a conventional automotive transmission to provide for "inching or creeping" the lift truck at a substantially constant speed during which "creeping" interval the engine may or may not be running at a relatively high speed for manipulating the load supporting apparatus.

Additional objects and advantages of the control servomechanism of the present invention will be apparent to one skilled in the art to which it pertains and upon reference to the following disclosure of a preferred embodiment thereof and which is illustrated in the accompanying drawings forming a part of this specification and wherein:

FIG. 1 is a side elevational view of a hydraulically controlled drive assembly especially designed for use in an industrial lift truck and embodying the present invention;

FIG. 2 is a sectional view of a shift linkage provided in the drive assembly of FIG. 1, and which includes a hydraulically operable control for actuating said linkage effective to shift the transmission of said assembly into forward or reverse drive;

FIG. 3 is a side elevational view of the drive assembly shown in FIG. 1 and with the control servomechanism of the present invention incorporated into the control system for said assembly;

FIG. 4 is a fragmentary plan view of the control servomechanism as is shown in FIG. 3;

FIG. 5 is a horizontal sectional view of a control valve especially designed for use in the instant control servomechanism;

FIG. 6 is a fragmentary sectional view taken through the housing of the servomechanism and showing the creeper control valve in one of its actuated positions; and FIG. 7 is a view similar to FIG. 6 but showing the valve in another of its actuated positions.

Briefly, the control servomechanism of the present invention is especially designed for use in a drive assembly of the type that is disclosed in the Curtis U.S. Patent 2,861,480, which assembly is provided with a component (shaft 78) that is responsive to the transmission being actuated toward and/or into forward or reverse drive and which component is utilized to obtain a control function for the control servomechanism.

In the embodiment of drive assembly illustrated in said Curtis patent the yoke 76 on the shaft 78 is swingably actuatable in response to the hydraulically controlled actuating means of the drive assembly actuating in turn the transmission thereof toward either its forward or reverse drive position.

In the instant embodiment of control servomechanism hereinafter to be described in detail, the shaft 15 corresponding to the shaft 78 of said Curtis assembly is free to rotate and this movement in combination with a manual operation performed by the vehicle operator are utilized to initiate the control function of the instant control servomechanism, however as will be later apparent any equivalent component of said drive assembly that is responsive to the actuation of the clutch thereof may also be utilized as the initiating media for said control servomechanism.

With reference directed now particularly to FIG. 1 of the drawings, a conventional type of lift truck drive assembly is herein shown and is seen to include a primary power source, being herein shown as an internal combustion engine 6, a combination torque converter and gear transmission 7 having an output drive shaft 9 which corresponds to the output drive shaft 70 in the aforementioned Curtis drive assembly, and which shaft is connectable in any conventional manner to the drive wheels of the lift truck.

The drive assembly, as is more fully described in the aforementioned Curtis patent also utilizes a fluid actuated clutch linkage, the fluid control of which is connected into a closed hydraulic control circuit that is, in turn, manually controlled from the operator's station on the lift truck to actuate the clutch of the combination torque converter and gear transmission 7 and to thereby shift the transmission into forward or reverse drive.

As illustrated herein, only the clutch linkage and fluid control therefor and transmission components of said drive assembly that are used in conjunction with the servomechanism of the present invention are shown and for a more detailed explanation of the complete drive assembly, reference is directed to the aforementioned Curtis patent.

As shown particularly in FIGS. 1 and 2, a preferred embodiment of closed hydraulic control circuit for use with said fluid control and clutch linkage is seen to include a shift cylinder 10 having a movable piston as indicated at 11 and which mounts a piston rod 12. Said piston rod, in turn, is connectable through linkage 13 to a yoke 14 corresponding to yoke 76 in said Curtis assembly.

The yoke 14 is mounted upon and keyed to shaft 15 rotatably journaled in transmission housing 8 and extending thereacross, said shaft corresponding to shaft 78 in the Curtis assembly but differing from the latter by being greater in length so as to project outwardly from the right side wall of the housing as viewed in FIG. 2. In actual practice when incorporating the control servomechanism of the present invention into a previously constructed drive assembly such as of the Curtis type above referred to, the shaft 78 thereof is removed and substituted by shaft 15, the reason for which will be hereinafter apparent.

The yoke 14 is provided with spaced arms 14a which are connectable to a carrier 16 slidably mounted on the center shaft 18 for the transmission unit of said drive assembly.

By swinging the yoke 14 so as to slide the carrier 16 along the shaft 18, for example, in the direction into the plane of FIG. 2, the coupling is actuated so as to shift the transmission into reverse drive effective to propel the lift truck in a reverse direction identical to the action of carrier 74 in actuating the transmission of the Curtis assembly. In like manner, the yoke 14 may be swingable in the opposite direction effective to slidably move the carrier along the shaft 18 in a direction upwardly out of the plane of FIG. 2 effective to actuate the coupling and shift the transmission into forward drive whereby the lift truck will move in the opposite direction.

The shift cylinder 10 is connectable into the hydraulic control circuit so that the operator may selectively actuate the same from his station on the lift truck.

For this purpose, as is best seen in FIGS. 1 and 2, the shift cylinder 10 is preferably mounted adjacent the transmission housing 8 and to have conduits 21 and 22 connectable to opposite ends thereof and which conduits, in turn, connect to the control servomechanism embodying the present invention and which is incorporated into said drive assembly thus becoming an integral part thereof and which is identified in its entirety by the reference numeral 23, being likewise preferably mounted in its present use on the forward end of the aforesaid transmission housing 8.

Conduit 25 communicating at its one end with the control servomechanism connects at its opposite end to the hydraulic fluid sump 26, and an inlet conduit 27 is seen to connect at one end to said servomechanism and at its opposite end to a conventional integral hydraulic pump 27a said pump as is understood connecting by conduit 27b with the outlet of sump 26, to thus comprise a closed hydraulic control circuit as is referred to in the art.

As best seen in FIG. 5, the conduits 21 and 22 connect respectively with ports 32 and 31 in the housing 30 of the control servomechanism whereas inlet conduit 27 and conduit 25 connect respectively with housing ports 33 and 34.

As thus incorporated into the drive assembly, the control servomechanism of the present invention as is aforementioned is intended to enable the operator to actuate said drive assembly and inch or creep the vehicle in either a forward or reverse direction at a substantially constant rate of speed.

To accomplish this and with particular reference now directed to FIG. 5, the control servomechanism 23 is seen to comprise housing 30 which is substantially C-shaped in configuration and having a left bell part 30a and a right bell part 30b integrally formed on opposite ends of a central body 30c.

The left bell portion 30a is provided with an internal bore 35 extending longitudinally therethrough, said bore communicating with an enlarged chamber 36 adjacent its one end, said chamber in turn, communicating with port 37 which connects at its opposite end with the sump port 34.

Ports 31 and 32 are formed in the left bell portion 30a and communicate in longitudinal spaced relation with the bore 35.

As aforementioned, port 32 connects with conduit 21 whereas port 31 connects with the conduit 22, said valve bore 35 being thereby in circuit with the opposite ends of the shift cylinder 10.

An inlet port as identified at 40, is likewise seen to communicate at its one end with the valve bore 35 preferably centrally between the ports 31 and 32, said interposed inlet port connecting at its opposite end with a passage 41 extending longitudinally through the central body portion 30c of said housing 30.

The opposite end of the bore 35 is seen to communicate with an enlarged chamber 42 which connects in turn with the aforementioned sump through the aforesaid port 34.

A valve plunger, as identified in its entirety at 45, is disposed in the valve bore 35 and is intended to be manually actuatable by the operator of the lift truck to connect either end of the shift cylinder 10 in circuit with the fluid source of the hydraulic control system to thus actuate said cylinder and shift the transmission into forward or reverse drive to thereby control the direction of movement for the lift truck.

The valve plunger 45, as seen in FIG. 5, is disposed in its "neutral" position whereby fluid entering said valve bore 35 through the inlet port 40 passes through said bore and outwardly through both outlet ports 31 and 32 and hence to opposite ends of the shift cylinder 10 to thus provide for hydraulically equalizing the fluid pressure on both sides of the piston 11 of said cylinder.

The valve plunger 45 is formed with a pair of raised valve lands 48 and 49 spaced longitudinally therealong and which are intended to be operable when moved adjacent predetermined wall sections of the valve bore 35 to thus effect a fluid seal therebetween.

The valve plunger 45 is connectable by any suitable linkage such as is shown at 51 to any conventional type of manual control mounted in the operator's station whereby as said control is manipulated by the operator the valve plunger may be slidably moved through said valve bore.

To provide for shifting the transmission into forward drive, the valve plunger 45 is slidably moved in a downward direction as viewed in FIG. 5 to a position where the valve land 48 is disposed within the bore wall section 35c effective to provide a fluid seal therebetween and to seal the outlet port 31 from the inlet port 40 and likewise from the source of hydraulic fluid. When this occurs, hydraulic fluid is directed through port 32 and conduit 21 to the upper end of the shift cylinder 10 as viewed in FIG. 2 effective to propel the piston 11 therein in a downward direction whereby the shaft 15 is rotated so as to swing the yoke 14 in a direction outwardly of the plane of FIG. 2 whereby the coupling is actuated to shift the transmission into forward drive.

As the shift cylinder is thus actuated, the hydraulic fluid disposed forwardly of said piston is permitted to drain through conduit 22, connected port 31 and through the bore 35 to the chamber 42 and hence to the aforesaid sump.

In like manner, to shift the transmission into reverse drive the valve plunger 35 is moved in an upward direction through the valve bore as viewed in FIG. 5 to a position wherein the valve land 49 is disposed within bore section 35b.

As a result fluid is directed through port 31, conduit 22 to the lower end of the shift cylinder 10 as viewed in FIG. 2 so as to reversibly actuate the same. Fluid disposed forwardly of the piston 11 in the upward direction of movement drains through conduit 21, port 32, chamber 36 and communicating port 37 to the aforesaid sump.

Shaft 15 is thus rotated in the opposite direction so as to swing the yoke 14 inwardly into the plane of FIG. 2 such that the coupling is actuated to shift the transmission into reverse drive.

In prior drive control systems for use in the type of drive assembly disclosed herein the shift cylinder 10 is usually connected to a maximum hydraulic fluid flow throughout substantially each complete shift cycle and consequently as the piston 11 approaches the end of its shift stroke, its velocity is such that the transmission rapidly shifts to thereby cause the vehicle to suddenly lurch in the direction of intended motion.

The servomechanism of the present invention includes control means which, when incorporated into the drive control system variably regulates the flow of hydraulic fluid to the shift cylinder during each shift cycle so as to enable the shift cylinder to shift the transmission without any sudden or lurching movements resulting therefrom.

To accomplish this, the conduit 27 connecting with the hydraulic pump communicates with the inlet port 33 which is formed in the right bell portion 30b of the housing 30, said inlet port communicating through passage 53 with a valve bore 54 extending longitudinally through said bell portion.

A transfer port 56 is seen to communicate with said valve bore 54 being spaced longitudinally therealong from the passage 53, said transfer port extending through said bell portion to connect at its opposite end with passageway 58.

The opposite end of the passageway 58 is seen to communicate with a pair of channels 61 and 62, the opposite end of channel 61 being formed with a constricted throat of somewhat lesser diameter, as is indicated at 63, whereas channel 62 communicates at its opposite end with chamber 65 formed in the central body portion 30c and extending partially longitudinally therethrough.

The restricted throat portion 63 of channel 61 is seen to communicate with the aforementioned passage 41, the latter likewise connecting with the opposite end of the chamber 65.

An accumulator valve as identified in its entirety by the reference numeral 70, and which is seen to be somewhat spool-like in configuration is disposed within the chamber 65.

Valve 70 is seen to be formed with land portions 71 and 72 on the opposed ends thereof, the body portion of said valve extending therebetween being of slightly lesser diameter to thus define an annular spacing 65a between the same and the wall of the chamber 65.

The diameter of each land portion 71 and 72 is intended to be such as to be in slidable engagement with the chamber wall and provide a fluid seal therebetween.

Valve 70 is seen to be provided with a blunt nose portion 75 which is urged by spring 78 into pressure engagement with seat 79 to thereby define the rest position therefor as is shown in FIG. 5.

With this valve construction, as the valve plunger 45 is initially moved to either of its actuated positions effective to initiate movement of the piston 11 of the shift cylinder 10, the hydraulic fluid passing into passageway 58 flows through both channels 61 and 62, the fluid passing through channel 61 exiting therefrom through the constricted throat 63 and into the passage 41, and in like manner the fluid passing through channel 62 passing through the annular spacing 65a between the body portion of the valve 70 and the walls of the chamber 65 and then into the passage 61 to again combine with the aforesaid fluid flow out of the throat 63. Said combined flow then passes through valve bore 35 and into the actuated end of the shift cylinder 10 in the manner previously described.

The piston 11 is thereby moved toward its shifted position, and as it approaches said position the hydraulic pressure of the actuating fluid increases and as it reaches a predetermined magnitude it forces the accumulator valve 70 to the right as viewed in FIG. 5 wherein its land portion 71 moves into sealing relation with the walls of the chamber 65 being thus effective to stop the flow of fluid through channel 62 and connected annular spacing 65a in said chamber 65.

As a result, a reduced fluid flow passes through the channel 61 and through its constricted throat 63 to the shift cylinder 10 which restricted flow is thus effective to appreciably reduce the velocity of the piston 11 as it approaches its fully shifted position which in effect shifts the transmission without any sudden lurching movement resulting therefrom.

To provide for controlling the creeping of the vehicle from the operator's station, the control servomechanism of the present invention incorporates a valve plunger 81 which is disposed in the valve bore 54, said plunger being formed with a pair of longitudinally spaced neck portions 81a and 81b of reduced diameter, being separated from each other by a valve land 82, the latter, in turn, having a flat formed thereon as is indicated at 83 extending partially longitudinally therealong to thus define an arcuate shoulder 84 on one end thereof.

The bore 54 is seen to communicate at its lower end as viewed in FIG. 5, with an enlarged chamber 85, said chamber communicating, in turn, through passage 86 to the aforementioned sump.

As shown in FIG. 5, the valve plunger 81 is located in its "travel position" whereby as the valve plunger 45 is shifted to either its forward or reverse position to thus shift the transmission into its forward or reverse drive range, respectively, the hydraulic fluid is freely transmitted through passage 53, and connected transfer port 56 to the shift cylinder 10 so as to actuate the same in the manner previously described.

The valve plunger 81 is intended to be actuated to a "creeping position" such as is shown in FIG. 7 whereat a predetermined portion of the hydraulic fluid for actuating the shift cylinder 10 is withdrawn and returned to the sump for the hydraulic system resulting thereby in slipping the fluid actuated clutch interconnecting the transmission to the engine which enables the vehicle to be moved at a substantially slow "creeping speed" with the engine running at a relatively higher velocity.

The shaft 15, as is aforementioned, extends outwardly from the side wall of the transmission housing 7 and is rotatably actuatable by the shift cylinder 10 being powered to either of its "shifted" positions.

A cam plate 89 is mounted on said shaft extension so as to be rotatably therewith, said cam plate as best seen in FIG. 3 being generally of rectangular configuration and having a pair of elongated slots 89a and 89b formed therein, one of said slots being disposed adjacent each of the end walls of said plate.

A cam arm 91 is seen to be bifurcated on its one end so as to define a pair of spaced fingers 91a and 91b each of which carries a suitable pin 92 adjacent its end, said pin being slidably journaled within one of the cam plate slots 89a and 89b to thereby connect said arm to said cam plate 89.

The opposite end of the cam arm 91 is swivelly attached at 94 to one end of a link 96, the latter at its mid-point 97 being pivotally attached to a bracket 98 affixed to the end of the valve plunger 81. The opposite end of said link 96 is swivelly attached at 99 to connector arm 102, the latter, in turn, connecting through a suitable fastener such as ball and socket connector 103 to one end of a link 104. The opposite end of link 104, in turn, connects to a suitable creeper control such as pedal 106 so as to be movable with the same, said pedal being swingably mounted at 108 to the vehicle frame and thus conveniently located in the operator's station of said vehicle.

As will be recalled, when the shift cylinder 10 is actuated to shift the transmission into its forward or reverse range, the shaft 15 is also rotated accordingly, thus indicating the engagement of said transmission.

As viewed in FIG. 3, it will be assumed that when the transmission is shifted into its forward range the shaft 15 will be rotated in a clockwise direction and conversely in a counterclockwise direction in response to the transmission being shifted into its reverse range.

This rotational actuation of the shaft 15 operates to swing the cam 89 in the same direction through an arc sufficient to pull the cam arm 91 to the right as viewed in FIG. 3 against the resistance of springs 115 and 116 interconnected between said cam arm and the cam arm guide bracket 115a on the transmission and between link 96 and the frame of the vehicle respectively. As a result link 96 is swung in a counterclockwise direction about pivotal connection 99 as viewed in FIG. 4, and valve plunger 81 is moved slightly into the valve bore 54 to a creeper "preset" position which is between the FIG. 5 and FIG. 7 positions for said plunger.

This pre-positioning of plunger 81 does not effect the operation of the transmission and the latter functions in the usual manner to propel the vehicle in the intended direction. However, as will later appear this presetting of plunger 81 provides a more sensitive and positive control for creeping the vehicle than heretofore possible in prior art control systems.

To initiate creeping of the vehicle, the operator depresses the control pedal 106 so as to swing the latter about its connection 108 with the vehicle frame which is operable to swing link 96 in a clockwise direction about pivotal connection 94 as viewed in FIG. 4.

The valve plunger 81 is thereby slidably moved into valve bore 54 to the position shown in FIG. 6 whereby the valve land 82 and shoulder 84 formed thereon is disposed in sealing relation with the bore portion 54a thus sealing the fluid inlet from the housing passage 56.

Neck portion 81b of valve plunger 81 is likewise disposed in valve bore portion 54b so as to connect the sump to the passage 56 through said bore portion and chamber 85 which is effective to initiate the drainage of shift cylinder 10.

As a result of the decrease in the fluid pressure in the shift cylinder 10 its piston 11 starts to return to its neutral position which, in turn, also causes the yoke 14 to swing back toward its neutral position so as to initiate slipping the transmission clutch.

The shaft 15 is rotated in the opposite direction to that which it was previously rotated to engage the transmission, and as a result the cam plate 89 is likewise rotated therewith and releases the cam arm 91.

The cam arm 91 is then pulled by spring 115 to the left as viewed in FIG. 3 until the lower pin 92 approaches the left end of slot 89b in cam plate 89. During this movement, the link 96 swings in a clockwise direction about pivotal connection 99 as seen in FIG. 4 so as to draw the plunger 81 out of the housing 30 to a position such as is shown in FIG. 7.

In this position, the shoulder 84 of the plunger 81 is disposed in the port 56 communicating with the valve bore 54 so as to permit fluid to pass into the passage 58 and to the shift cylinder 10 while likewise permitting fluid to drain through said port 56, bore portion and communicating chamber 85 to the system sump.

As a result the shift cylinder 10 is partially energized so as to partially actuate the transmission clutch which is effective to cause slipping of the same and effect creeping of the vehicle.

As the fluid pressure is increased in the shift cylinder 10 the piston 11 is again moved toward its transmission fully energized position and is effective to rotate the shaft 15 and cam plate 89 so as to pull the cam arm 91 to the right as viewed in FIG. 4.

Provided the control pedal 106 is depressed to an initial creeping position and held at said position, the pivotal connection 99 is thereafter stationary relative to the servo-housing 30.

Consequently, as the cam arm 91 moves to the right the link 96 swings counterclockwise to again move the valve plunger 81 into the valve bore 54 to re-position the valve land 82 and shoulder 84 within the annular port 56 so as to decrease the fluid passing therethrough to the passage 58 and shift cylinder 10 while simultaneously permitting a proportionate greater quantity to drain to the system sump. In this manner the valve plunger feeds a predetermined quantity of fluid to the shift cylinder while simultaneously permitting a predetermined quantity of fluid to bleed from said cylinder to the aforesaid sump, the net result being to energize the shift cylinder 10 sufficiently to slip the transmission clutch coupling the desired amount and in proportion to the pedal depression.

The valve plunger 81 will thereby be reciprocated within its bore 54 and will thus seek and establish a "creeping position" in response to the initial actuation of the control pedal 106 whereby the clutch coupling the transmission to the engine slips so that the vehicle will move at a predetermined creeping speed.

In this manner therefore, the vehicle may be moved at a relatively slow rate of speed while the engine is running at a relatively high rate of speed so as to provide adequate power for other uses such as, for example, raising and/or lowering the work supporting carriage on an industrial lift truck or the like.

If the operator requires a slower creeping velocity, he merely depress the control pedal 106 an additional proportionate distance to initiate a further actuation of the servomechanism.

The link 96 begins to swing in a clockwise direction about pivot 94 as viewed in FIG. 4 tending to move the valve plunger 81 into its valve bore 54 and thereby change the fluid balance in the system.

As a result the clutch further slips in proportion to said additional pedal actuation whereby the vehicle begins to move at a somewhat slower rate of speed.

As the clutch slips this additional amount, the shaft 15 is rotated in response thereto so as to swing the cam plate 89 and again release the cam arm 91 whereby the latter under the influence of spring 115 moves proportionately to the left as viewed in FIG. 4 effective to swing the link 96 in a clockwise direction about pivotal connection 99 to again re-position the valve plunger 81 at the new "creeping position" therefor.

In actual use it has been found the control servomechanism is sufficiently rapid in its response to the actuation of the control pedal 106 so that the valve plunger 81 appears to remain stationary in the housing 20 during this additional adjustment.

When the operator no longer desires to creep the vehicle, he may let up on the control pedal 106 whereupon the latter automatically returns to its drive position under the influence of spring 125 interconnected between the link 104 and the vehicle frame. Link 104 is swung clockwise about its connection 108 with pedal 106 and is effective to swing link 96 in a counterclockwise direction as seen in FIG. 4 about pivotal connection 94 and begins to pull the valve plunger 81 out of the housing 30.

Valve plunger 81 begins to move toward its FIG. 5 position and when its shoulder 84 moves into valve bore portion 54b, port 56 is sealed from the sump whereupon all of the fluid entering valve bore 54 through inlet port 33 passes into port 56 and connected passage 58 to the shift cylinder 10.

Consequently, the shift cylinder 10 is energized so as to fully engage the transmission and resume a normal vehicle speed.

As the shift cylinder 10 is being fully energized, the shaft 15 is rotated so as to pull the cam arm 91 to the right as viewed in FIG. 4 which is effective to swing link 96 counterclockwise so as to enable the valve plunger 81 to be returned to its "travel position" as shown in FIG. 5 within a relatively short period of time.

Having thus described in detail a preferred embodiment of control servomechanism of the present invention it will be realized that the same is susceptible to various modifications, arrangements and combinations of parts without departing from the inventive concepts thereof as are defined in the appended claims.

What is claimed is:

1. In a drive assembly for a vehicle having a source of motive power and power transfer means including transmission means having fluid controlled coupling means actuatable to connect said transmission means in power transfer relation between said source and the drive wheels of said vehicle; control means comprising a hydraulic fluid system connected to said coupling means, means for directing an actuating quantity of fluid to said coupling means being effective to energize the latter and connect said transmission means in said power transfer relation so as to propel said vehicle selectively in forward and reverse directions at a speed responsive to the speed of said source, sensor means in said system operable to relieve said coupling means of a portion of said actuating fluid effective to cause a reduction in the power transfer between said motive source and transmission means, means operatively connecting said transmission means to said sensor means whereby said sensor means is thereafter responsive to said transmission means adjusting to said reduction in power transfer for continuously relieving said coupling means of a predetermined portion of said fluid so as to effect a constant reduction in said power transfer and a consequent driving of said vehicle at a reduced creeping speed.

2. In a drive assembly for a vehicle having a source of motive power and power transfer means including transmission means having fluid controlled coupling means actuatable to connect said transmission means in power transfer relation between said source and the drive wheels of said vehicle; control means comprising a hydraulic fluid system connected to said coupling means, means for directing an actuating quantity of fluid to said coupling means being effective to energize the latter and connect said transmission means in said power transfer relation so as to propel said vehicle selectively in forward and reverse directions at a speed responsive to the speed of said source, valve means in said system operable to relieve said coupling means of a portion of said actuating fluid effective to cause a reduction in the power transfer between said motive source and transmission means, link means operatively connecting said transmission means to said valve means whereby said valve means is thereafter responsive to said transmission means adjusting to said reduction in said power transfer for continuously relieving said coupling means of a predetermined portion of said fluid so as to effect a constant reduction in said power transfer and a consequent driving of said vehicle at a reduced creeping speed.

3. In a drive assembly for a vehicle having a source of motive power and power transfer means including transmission means having fluid controlled coupling means actuatable to connect said transmission means in power transfer relation between said source and the drive wheels of said vehicle; control means comprising a hydraulic fluid system connected to said coupling means, means for directing an actuating quantity of fluid to said coupling means being effective to energize the latter and connect said transmission means in said power transfer relation so as to propel said vehicle selectively in forward and reverse directions at a speed responsive to the speed of said source, sensor means including a housing connected into said system, valve means in said housing being operable to relieve said coupling means of a portion of said actuating fluid effective to cause a reduction in the power transfer between said motive source and transmission means, means operatively connecting said sensor means to said transmission means whereby said valve means is thereafter responsive to said transmission means adjusting to said reduction in said power transfer for continuously relieving said coupling means of a predetermined portion of said fluid so as to effect a constant reduction in said power transfer and a consequent driving of said vehicle at a reduced creeping speed.

4. In a drive assembly for a vehicle having a source of motive power and power transfer means including transmission means having fluid controlled coupling means actuatable to connect said transmission means in power transfer relation between said source and the drive wheels of said vehicle; control means comprising a hydraulic fluid system connected to said coupling means, means for directing an actuating quantity of fluid to said coupling means being effective to energize the latter and connect said transmission means in said power transfer relation so as to propel said vehicle selectively in forward and reverse directions at a speed responsive to the speed of said source, sensor means including a housing connected into said system, valve means in said housing being operable to relieve said coupling means of a portion of said actuating fluid effective to cause a reduction in the power transfer between said motive source and transmission means, link means operatively connecting said valve means to said transmission means whereby said valve means is thereafter responsive to said transmission means adjusting to said reduction in said power transfer for continuously relieving said coupling means of a predetermined portion of said fluid so as to effect a constant reduction in said power transfer and a consequent driving of said vehicle at a reduced creeping speed.

5. In a drive assembly for a vehicle having a source of motive power and power transfer means including transmission means having fluid controlled coupling means actuatable to connect said transmission means in power transfer relation between said source and the drive wheels of said vehicle; control means comprising a valve housing and a hydraulic fluid system connected to said housing and said coupling means, valve means in said housing for directing an actuating quantity of fluid to said coupling means being effective to energize the latter and connect said transmission means in said power transfer relation so as to propel said vehicle selectively in forward and reverse directions at a speed responsive to the speed of said source, sensor means in said housing operable to relieve said coupling means of a portion of said actuating fluid effective to cause a reduction in the power transfer between said motive source and transmission means, means operatively connecting said sensor means to said transmission means whereby said sensor means is thereafter responsive to said transmission means adjusting to said reduction in said power transfer for continuously relieving said coupling means of a predetermined portion of said fluid so as to effect a constant reduction in said power transfer and a consequent driving of said vehicle at a reduced creeping speed.

6. In a drive assembly for a vehicle having a source of motive power and power transfer means including transmission means having fluid controlled coupling means actuatable to connect said transmission means in power transfer relation between said source and the drive wheels of said vehicle; control means comprising a valve housing and a hydraulic fluid system connected to said housing and said coupling means, first valve means in said housing for directing an actuating quantity of fluid to said coupling means being effective to energize the latter and connect said transmission means in said power transfer relation so as to propel said vehicle selectively in forward and reverse directions at a speed responsive to the speed of said source, sensor means in said housing including second valve means operable to relieve said coupling means of a portion of said actuating fluid effective to cause a reduction in the power transfer between said motive source and transmission means, link means interconnecting said transmission means to said last named valve means whereby the latter is thereafter responsive to said transmission means adjusting to said reduction in said power transfer for continuously relieving said coupling of a predetermined portion of said fluid so as to effect a constant reduction in said power transfer and a consequent driving of said vehicle at a reduced creeping speed.

7. In a drive assembly for a vehicle as is defined in claim 6 and wherein the first valve means is slidably actuatable in said housing to direct an actuating quantity of fluid to said coupling means.

8. In a drive assembly for a vehicle as is defined in claim 6 and wherein the second valve means is slidably actuatable in said housing to relieve said coupling means of a portion of said actuating fluid.

9. In a drive assembly for a vehicle as is defined in claim 6 and wherein the first and second valve means are disposed in the housing and in series controlling relation in said fluid system.

10. In a drive assembly for a vehicle having a source of motive power and power transfer means including transmission means having fluid controlled coupling means actuatable to connect said transmission means in power transfer relation between said source and the drive wheels of said vehicle; control means comprising a hydraulic fluid system connected to said coupling means, means for directing an actuating quantity of fluid to said coupling means being effective to energize the latter and connect said transmission means in said power transfer relation so as to propel said vehicle selectively in forward and reverse directions at a speed responsive to the speed of said source, reaction means in said transmission means actuatable in proportion to the magnitude of the power transfer between said motive source and said transmission means, sensor means in said system operable to relieve said coupling means of a portion of said actuating fluid effective to cause a reduction in said power transfer between said motive source and transmission means, means operatively connecting said reaction means to said sensor means whereby said sensor means is thereafter responsive to said transmission means adjusting to said reduction in said power transfer for continuously relieving said coupling means of a predetermined portion of said fluid so as to effect a constant reduction in said power transfer and a consequent driving of said vehicle at a reduced creeping speed.

11. In a drive assembly for a vehicle having a source of motive power and power transfer means including transmission means having fluid controlled coupling means actuatable to connect said transmission means in power transfer relation between said source and the drive wheels of said vehicle; control means comprising a hydraulic fluid system connected to said coupling means, first valve means for directing an actuating quantity of fluid to said coupling means being effective to energize the latter and connect said transmission means in said power transfer relation so as to propel said vehicle selectively in forward and reverse directions at a speed responsive to the speed of said source, reaction means in said transmission means actuatable in proportion to the magnitude of the power transfer between said motive source and said transmission means, sensor means in said system including second valve means operable to relieve said coupling means of a portion of said actuating fluid effective to cause a reduction in said power transfer between said motive source and transmission means, means operatively connecting said reaction means to said second valve means whereby the latter is thereafter responsive to said transmission means adjusting to said reduction in said power transfer for continuously relieveing said coupling means of a predetermined portion of said fluid so as to effect a constant reduction in said power transfer and a consequent driving of said vehicle at a reduced creeping speed.

12. In a drive assembly for a vehicle having a source of motive power and power transfer means including transmission means having fluid controlled coupling means actuatable to connect said transmission means in power transfer relation between said source and the drive wheels of said vehicle; control means comprising a hydraulic fluid system connected to said coupling means, first valve means for directing an actuating quantity of fluid to said coupling means being effective to energize the latter and connect said transmission means in said power transfer relation so as to propel said vehicle selectively in forward and reverse directions at a speed responsive to the speed of said source, reaction means in said transmission means actuatable in proportion to the magnitude of the power transfer between said motive source and said transmission means, sensor means including a housing connected into said system, second valve means in said housing being operable to relieve said coupling means of a portion of said actuating fluid effective to cause a reduction in said power transfer between said motive source and transmission means, means operatively connecting said reaction means to said sensor means whereby said sensor means is thereafter responsive to said transmission means adjusting to said reduction in said power transfer for continuously relieving said coupling means of a predetermined portion of said fluid so as to effect a constant reduction in said power transfer and a consequent driving of said vehicle at a reduced creeping speed.

13. In a drive assembly for a vehicle having a source of motive power and power transfer means including transmission means having fluid controlled coupling means actuatable to connect said transmission means in power transfer relation between said source and the drive wheels of said vehicle; control means comprising a hydraulic fluid system connected to said coupling means, a housing connected into said system and to said coupling means, first valve means in said housing for directing an actuating quantity of fluid to said coupling means being effective to energize the latter and connect said transmission means in said power transfer relation so as to propel said vehicle selectively in forward and reverse directions at a speed responsive to the speed of said source, reaction means in said transmission means actuatable in proportion to the magnitude of the power transfer between said motive source and said transmission means, second valve means in said housing being operable to relieve said coupling means of a portion of said actuating fluid effective to cause a reduction in said power transfer between said motive source and transmission means, means operatively connecting said reaction means to said second valve means whereby the latter is thereafter responsive to said transmission means adjusting to said reduction in said power transfer for continuously relieving said coupling means of a predetermined portion of said fluid so as to effect a constant reduction in said power transfer and a consequent driving of said vehicle at a reduced creeping speed.

14. In a drive assembly for a vehicle as is defined in claim 13 and wherein the first and second valve means are in series controlling relation in said fluid system.

15. In a drive assembly for a vehicle as is defined in claim 14 and wherein accumulator valve means is interposed between said first and second valve means.

References Cited by the Examiner
UNITED STATES PATENTS 2,968,967  1/61  Ross _____ 74—732 X
2,972,906  2/61  Schroeder _____ 74—364 X DON A. WAITE, *Primary Examiner.*